Nov. 2, 1926.  
H. McLEAN ET AL  
CONCENTRATOR OR JIGGER  
Filed March 27, 1924

Inventors  
Harry McLean  
Fred H. Mason,  
By William W. Deane  
their Attorney Patented Nov. 2, 1926.

1,605,752

UNITED STATES PATENT OFFICE.

HARRY McLEAN AND FRED H. MASON, OF SCRANTON, PENNSYLVANIA.

CONCENTRATOR OR JIGGER.

Application filed March 27, 1924. Serial No. 702,324.

This invention relates to improvements in concentrators or jiggers and is designed primarily for use in the separation of coal from slate or other impurities, but it may obviously be used for the concentration of ores or other materials. The present machine has the following advantages over the jiggers now in general use. Plungers, which require a great deal of attention and up-keep, are eliminated; less repairs are necessary as nearly all of the working parts are out of the water, less power consumption on account of the principle employed; and low water consumption, as the same water is used over and over, thereby eliminating a circulating pump and plungers.

The main objects of the invention will be set forth in detail in the following description, and with these objects in view the invention consists in the novel features hereinafter described in detail, illustrated in the accompanying drawings, and more particularly pointed out in the appended claims.

Referring to the drawings.

Figure 1:
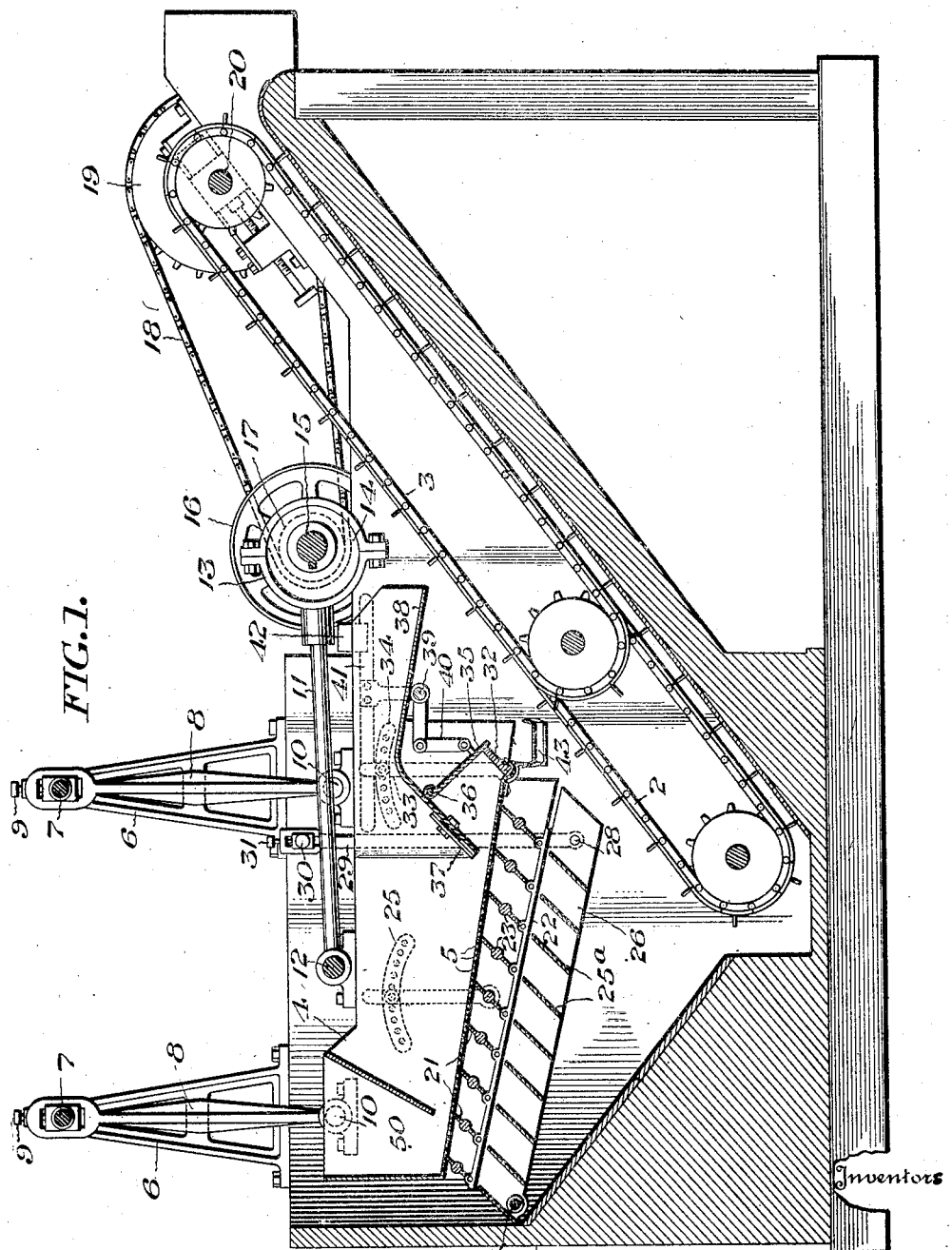
Figure 1 is a longitudinal vertical sectional view of the improved apparatus.
Figure 2:
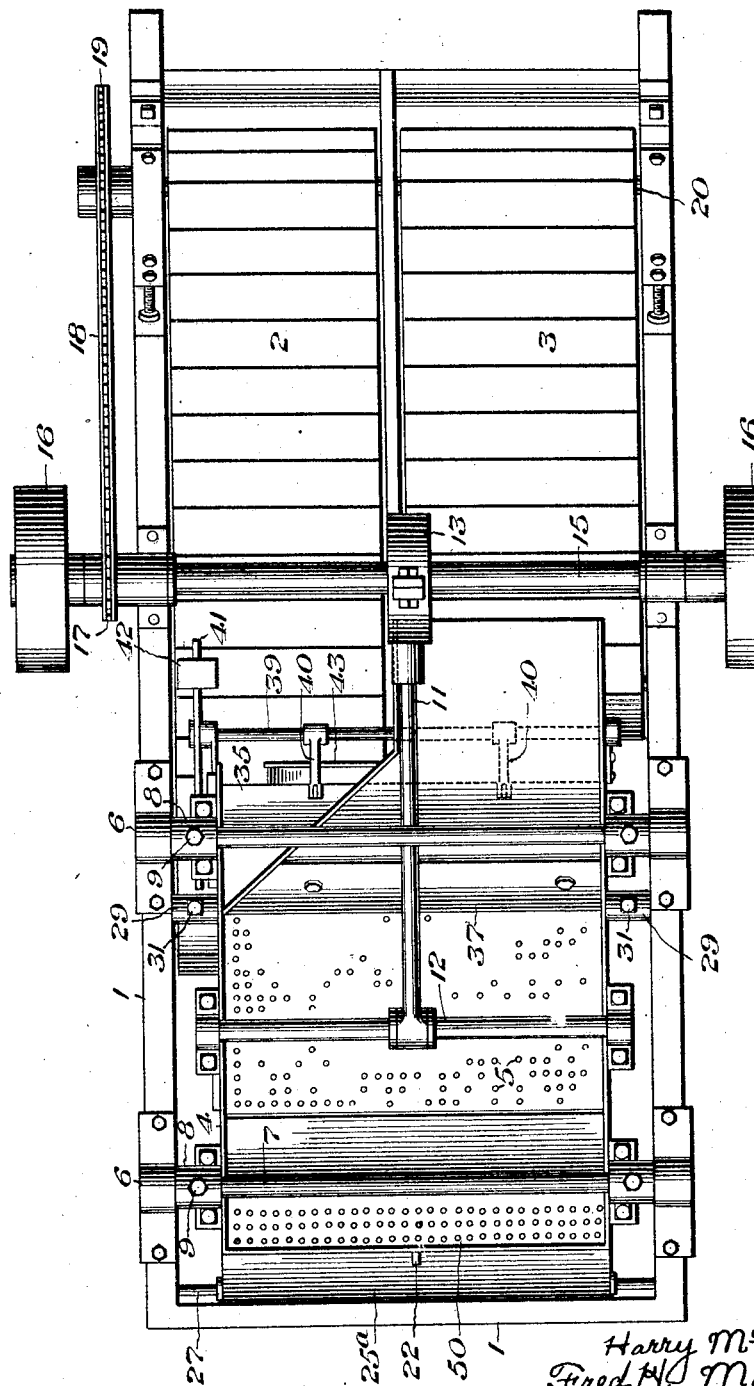
Fig. 2 is a top plan view of the same.

In the drawings, 1 designates a tank adapted to contain water and provided with a slate conveyor 2 and a coal conveyor 3 adapted to respectively discharge slate and coal from the tank. 4 designates a shaking pan or sieve actuated in a substantially horizontal plane by means hereinafter described. The bottom of this pan is perforated as shown at 5 to permit the water in the tank to pulsate through the same.

6 designates standards arranged at opposite sides of the tank and supporting rock shafts 7 on which are suspended links 8 capable of vertical adjustment by means of the screws 9. The lower ends of these links are pivotally connected at 10 to the sides of the shaking pan and these links support the pan while the latter is reciprocated in a substantially horizontal plane.

The mechanism for reciprocating the pan included a pitman 11 pivotally connected to the pan at 12 and provided at its opposite end with a loop or ring 13 which surround an eccentric 14 fixed on a power or driving shaft 15. This shaft has a pulley 16 adapted to be driven by an ordinary belt. The shaft in addition to driving the pan, also actuates the conveyors 2 and 3 and to accomplish this, a sprocket wheel 17 is fixed on the shaft and moves a sprocket chain 18 that drives a sprocket wheel 19 mounted on the conveyor shaft 20. It may be seen that when the pulley 16 is rotated by any suitable motor, the pitman 11 will move to and fro and the pan 4 will reciprocate in a horizontal plane, while the conveyors 2 and 3 will be moved in such manner that coal and slate will be discharged from the tank.

21 designates a series of flights or vanes all pivotally connected by means of a link 22. The flights have trunnions at 23 which rest in bearings formed in the side walls of the pan 4. One of the vanes has a trunnion long enough to extend through a side wall of the pan and a lever 24 is fixed to this trunnion and cooperates with a quadrant 25 on the side of the pan which allows the lever to be held in a definite position. In operation, this arrangement works similar to the shutters of a window and the purpose of these vanes is to cause upward pulsations of water while the vanes are being moved with the pan backward and forward in a substantially horizontal plane. The angle of these vanes, as may be readily seen, can be changed at the will of the operator, while the machine is in motion, as it is only necessary for the operator to move the lever 24. The idea of these vanes cutting the water and causing pulsations to rise through the material being handled, is one of the primary features of our invention, and especially this feature of the adjustment of the vanes.

25$^a$ indicates stationary flights or baffles connected at their ends to side bars 26, which are pivotally mounted on the stationary axle 27. The purpose of these baffles is to act as a steadying means for the body of water surrounding them. They prevent the surrounding water from moving backward and forward, or getting in tune with the movement of the vanes 21 moving over them, and thereby help to force the water up between the moving flights.

The front ends of the bars 26 are pivotally connected at 28 to links 29 suspended on studs 30 and vertically adjustable by means of screws 31. It is obvious that by actuating the screws, the front ends of the bars 26 may be raised or lowered slightly to adjust the substantially stationary flights 25ª. The adjustment of the links 29 will also accommodate the adjustment of the pan by means of the screws 9.

Figure 3:
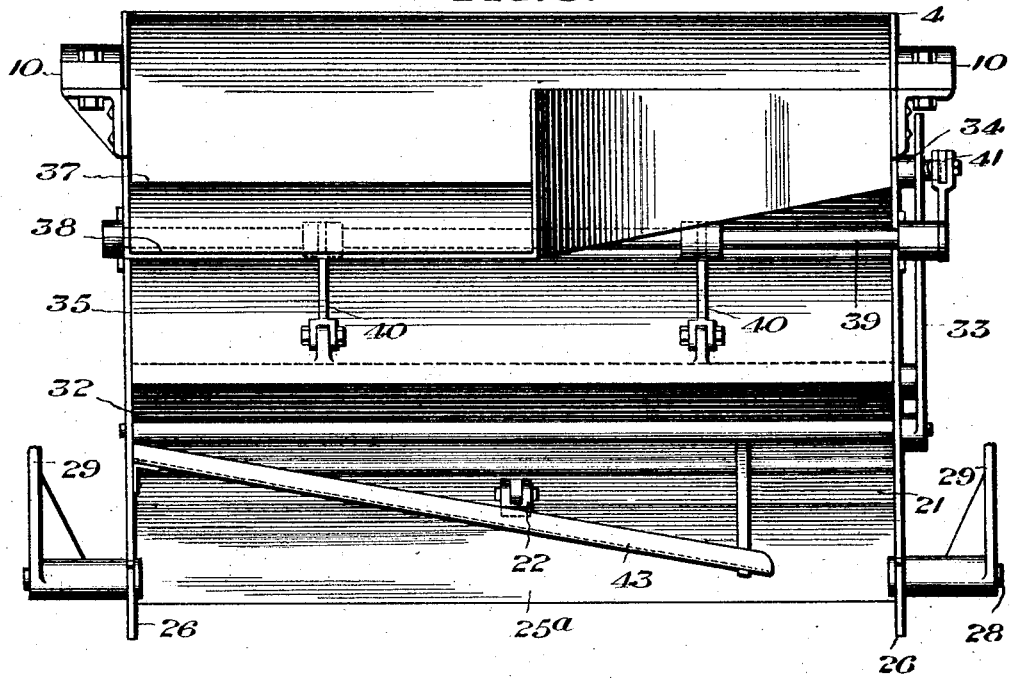
Fig. 3 is a rear view of the pan.
Figure 4:
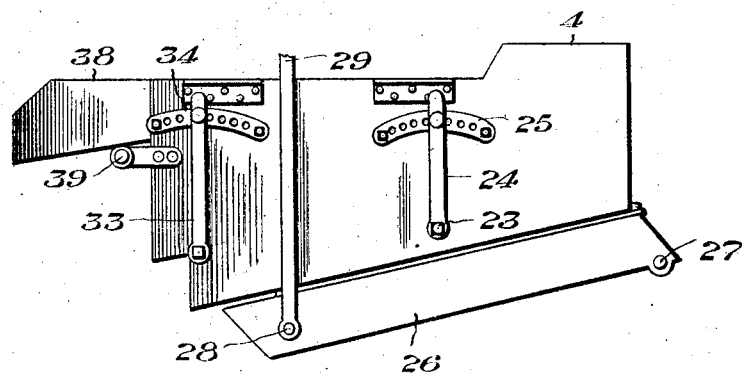
Fig. 4 is a reduced side view of the pan.

The successful operation of a jig, particularly on coal, depends very materially on always keeping a quantity of the heavy material in the separating medium, commonly called the bed or bottom. This material, after accumulating to a certain point, must be discharged; otherwise, it would again mix with the material from which it was separated. For the discharge and control of this heavier product we have devised automatic regulating means which will now be described. 32 is a baffle plate or lip having trunnions at its ends connected to the pan 4, one trunnion being fixedly connected at its outer end with a lever 33 that cooperates with a quadrant 34 arranged on one side of the pan. This lever permits the adjustment of the baffle plate 32 for changing its angularity or height. 35 designates a hinged or swinging gate, which is so made that it will cover the lip 32 regardless of the position of the latter. The gate is pivotally mounted at 36 beneath a dividing ledge 37 which extends across the front portion of the pan and is adapted to permit the slate and the like to move beneath the same and to direct the coal upwardly on to the discharge chute 38 which dumps the coal on to the conveyor 3. It may be seen from Fig. 3 that the chute 38 has its outer end of reduced width in order to guide the coal on to the conveyor 3 and to prevent the same from being deposited on to the conveyor 2.

39 designates a rock shaft connected by toggle links 40 to the gate 35 and provided at one end with a fixedly connected balance beam 41 having a counterweight 42. In practice, when the slate or heavier material accumulates beneath the ledge 37 and bears against the lip 32 and gate 35 with sufficient force, it will cause the gate 35 to swing in a counter-clockwise direction and the beam 41 will be rocked about the axis 39, so as to allow a quantity of the heavier material to be discharged on to the chute 43, which conveys the material laterally and deposits the same on the conveyor 2. When this over accumulation has been discharged, the gate 35 will fall to its original position and seal the opening against any further discharge until the accumulation again overcomes the weight. In considering this structure it is to be observed that the left hand end of the beam 41 is of greater weight than the right hand end.

In operation, the material treated is fed into the chamber 50 at the rear end of the pan 4 and it is obvious that this pan is at this time reciprocating back and forth. By moving the pan backward and forward in the tank of water, the water will be caused to pulsate up through the perforated bottom of the pan and by such pulsations, through the medium of specific gravity cause the heavier materials to settle down on the screen and travel forward to the point of their discharge, that is, through the gate 35. During this movement the pan is reciprocating in a substantially horizontal plane and it will be noted that the water is directed through the pan upwardly and toward the right, so that it assists in moving the materials lengthwise of the pan and toward the right. The pulsations of the water and the reciprocation of the pan will cause the heavier material to finally be discharged through the gate 35, and the lighter material such as coal to be discharged from the chute 38, and the conveyors then remove the separated particles from the machine.

From the foregoing it may be seen that we have devised a novel jigger or concentrator, and it is apparent that various changes may be made in the details disclosed without departing from the spirit of the invention as expressed in the claims.

What we claim and desire to secure by Letters-Patent is:

1. A concentrator comprising a tank for holding water, a pan within the tank and having a perforated bottom, means for vibrating said pan in a substantially horizontal direction, a plurality of vanes attached to said pan in spaced relation below the bottom thereof and partaking of its motion and inclined to the horizontal, a plurality of vanes attached to said tank below the vanes of the pan and inclined to the horizontal, said vanes coacting to produce a pulsating action of the water in the pan to effect a separation of the lighter material from the heavier material passing through the pan.

2. A concentrator comprising a tank for holding water, a pan within the tank having a perforated bottom, means for moving the pan back and forth horizontally, a plurality of pivotal vanes attached to the bottom of the pan, means for adjusting the said vanes in inclined positions with respect to the bottom of the pan, a plurality of vanes carried by the tank below the said vanes of the pan, means for raising and lowering said vanes in the tank, and means for raising and lowering the said pan.

3. A concentrator comprising a tank for holding water, a pan in the tank having a perforated and inclined bottom and discharging devices at the lower end of the bottom, means for moving the pan back and forth horizontally, a plurality of pivotal vanes attached to the bottom of the pan, means for adjusting the said vanes in inclined positions slanting upwardly towards the discharging end of the pan, a plurality of vanes carried by the tank below the said vanes of the pan, means for raising and lowering the said vanes in the tank, and means for raising and lowering the pan.

4. A concentrator comprising a tank for holding water, a pan within the tank having a perforated bottom, means for moving the pan back and forth horizontally, a plurality of pivotal vanes attached to the bottom of the pan, means for adjusting the said vanes in inclined positions with respect to the bottom of the pan, a series of vanes arranged below the said vanes of the pan and having one end of the series pivotally connected with the tank, means for raising and lowering the movable end of the said series of vanes, and means for raising and lowering the pan and for adjusting the inclination thereof with respect to the said series of vanes in the tank.

5. An apparatus of the class described, comprising a tank for water, a pan within the tank and having a perforated bottom, means for vibrating said pan in a substantially horizontal direction, means for adjusting said pan vertically, a plurality of vanes connected to said pan in spaced relation and inclined to the horizontal and partaking of the motion of the pan, a frame swinging at one end from the tank, means for vertically adjusting said frame at its free end, a plurality of vanes attached to the frame in spaced relation and inclined to the horizontal, the vanes of the pan and the vanes of the frame coacting to produce an upward pulsating action of the water through the pan as the same is vibrated in one direction, and producing a downward pulsating action of water through the pan when the same is vibrated in the opposite direction.

6. A concentrator including a tank adapted to contain water, a pan in said tank having a perforated bottom, means for reciprocating the pan in a substantially horizontal plane, a series of horizontal vanes arranged beneath the perforated bottom and moving with the pan, said vanes being arranged at an angle to the horizontal, a relatively stationary series of vanes arranged in the tank beneath the first named vanes, side bars to which the relatively stationary vanes are connected, means pivotally connecting one end of the side bars to the tank, and means for adjusting the other end of the side bars toward and away from the pan.

7. A concentrator including a tank adapted to contain water, a pan in said tank and having a perforated bottom, means for reciprocating said pan in a substantially horizontal plane, a series of vanes arranged beneath the perforated bottom and having horizontal trunnions connected to the pan, means for simultaneously swinging all of said vanes upon the trunnions, side bars arranged beneath the pan and pivotally connected at one end to the tank, a series of relatively stationary vanes arranged between the side bars and attached thereto and extending at angles to the horizontal, and means connected to the other ends of side bars for raising and lowering the same.

8. A concentrator comprising a tank for holding water, a pan arranged within the tank and having a perforated inclined bottom which extends downwardly toward its discharge end, a series of spaced vanes mounted beneath and adjacent to the perforated bottom and inclined with respect to the perpendicular with their upper edges extending toward the lower discharge end of the perforated bottom, said vanes being connected with the pan to reciprocate therewith while retaining the relative angular position, a series of spaced retarding vanes arranged beneath the first named vanes and extending transversely of the pan, said retarding vanes being inclined with respect to the perpendicular with their upper edges extending toward the discharge end of the perforated bottom, supporting means for the retarding vanes to hold them relatively stationary, and means to adjust the supporting means toward and away from the first named vanes.

9. A concentrator comprising a tank, a pan suspending therein and having a perforated bottom, means to reciprocate the pan in a generally horizontal plane, means arranged beneath the perforated bottom and connected with the pan for movement therewith and adapted to divide the water into a plurality of upwardly ascending streams, said means being adapted to effect the upward travel of the streams by virtue of its reciprocatory movement with the pan, water retarding means arranged within the tank near and beneath the dividing means and adapted to retard the horizontal movements of the water and to permit of the free upward movement of the same, and means to adjust the retarding means toward and away from the water dividing means.

In testimony whereof we affix our signatures.

HARRY McLEAN.
FRED H. MASON.